Jan. 5, 1971   C. CHRISTENSEN   3,552,788
TRUNK SEAT

Filed Sept. 17, 1968   2 Sheets-Sheet 1

INVENTOR.
CARL CHRISTIANSEN.
BY John H. Oltman
ATT'Y.

INVENTOR.
CARL CHRISTIANSEN.
BY John H. Oltman
ATT'Y.

United States Patent Office 3,552,788
Patented Jan. 5, 1971

3,552,788
TRUNK SEAT
Carl Christensen, Dayton, Ohio
(1100 NE. 1st Ave., Fort Lauderdale, Fla. 33304)
Filed Sept. 17, 1968, Ser. No. 760,207
Int. Cl. B60n 1/00
U.S. Cl. 296—64                                    5 Claims

ABSTRACT OF THE DISCLOSURE

A method of converting an existing trunk of an automobile into a trunk seat, including steps of disconnecting hinges of the existing trunk lid to free the trunk lid, re-connecting the trunk lid to the body of the automobile at the trunk opening so that the lid normally closes the trunk opening and can swing upward and rearward to open the trunk, providing a latch at the front of the lid for releasably latching the lid in closed position, and mounting a seat in the trunk so that a person may sit on the seat when the trunk lid is open. The invention also includes the structure comprising at least two telescoping legs connected respectively to the trunk lid and to the body of the automobile at opposite sides of the trunk opening for retaining the lid in an open position, latch means including a part at the front of the lid for holding the lid closed, and a seat mounted in the trunk space including a swingable back which may be lowered to permit closing of the lid.

BACKGROUND OF THE INVENTION

Although automobile rumble seats were quite popular years ago, rumble seats have not been provided in automobiles for quite some time. Although some people, and particularly young people, would like to have a rumble seat in their car, there has not been sufficient demand to justify production of special models with rumble seats.

SUMMARY OF THE INVENTION

The present invention provides a method of converting an existing trunk of an automobile into a trunk seat, and a particular trunk seat structure which utilizes the existing trunk lid of an automobile. Thus, the present invention makes it unnecessary to produce special models of automobiles having built-in rumble seats.

In accordance with the method of the invention, the existing trunk lid of a conventional automobile is disconnected from its existing hinges, and is re-connected to the body of the automobile so that the lid normally closes the trunk opening and can swing upward and rearward to open the trunk. A latch is provided at the front edge of the lid to cooperate with a latch part on the body of the automobile for holding the trunk lid closed. A seat is mounted in the trunk to complete the conversion of a trunk into a rumble seat. In a particular embodiment, the trunk is re-connected to the body of the auttomobile by telescoping legs provided on opposite sides of the lid and the trunk opening so that when the legs are fully extended, they limit the rearward movement of the lid at a generally vertical position, thus serving to retain the lid when it is swung open. The rear edge of the trunk lid may be connected by a hinge to the body of the automobile at the rear of the trunk opening, or a second latching means may be provided at the rear edge of the trunk lid with a cooperating part on the bumper of the automobile to enable the lid to be secured to the bumper when it is in open position. The latter latch makes it possible to lower the trunk lid when it is fully open. Thus, the invention includes the method of converting an existing trunk into a trunk seat, and also includes particular structure for a trunk seat utilizing the existing trunk of an automobile. The invention may be applied advantageously to automobiles having relatively small trunks and trunk lids, one such automobile being known as the "Mustang."

It is an object of the present invention to provide a method of converting the trunk of an automobile into a trunk seat utilizing the existing trunk lid of the automobile.

Another object of the invention is to provide a method of converting a trunk of an automobile into a trunk seat by disconnecting the hinges of the existing trunk lid to free the trunk lid, re-connecting the trunk lid to the body of the automobile so that it can open rearwardly, providing a latch at the front of the trunk lid and mounting a seat in the trunk space.

Another object of the invention is to re-connect the trunk lid to the automobile body with telescoping legs which permit the trunk lid to open rearwardly.

A further object of the invention is to carry out the step of re-connecting the trunk lid to the body of the automobile by hingedly connecting the rear edge of the trunk lid to the body at the rear of the trunk opening.

A further object of the invention is to provide a latch at the rear edge of the trunk lid cooperating with a keeper on the bumper of the automobile below the trunk so that the trunk lid may be secured to the bumper when it is in its open position.

Still another object of the invention is to provide a trunk seat in an automobile which utilizes the existing trunk lid of the automobile, and which includes at least two telescoping legs connected respectively to the opposite sides of the trunk lid and to corresponding portions of the body of the automobile for limiting the open position of trunk lid at a generally vertical position.

Further objects and features of the invention will be apparent in the course of the following description, reference being had to the accompanying drawings wherein a preferred form of the invention has been illustrated, and wherein like characters of reference are employed to denote like parts throughout the several figures.

Figure 1:
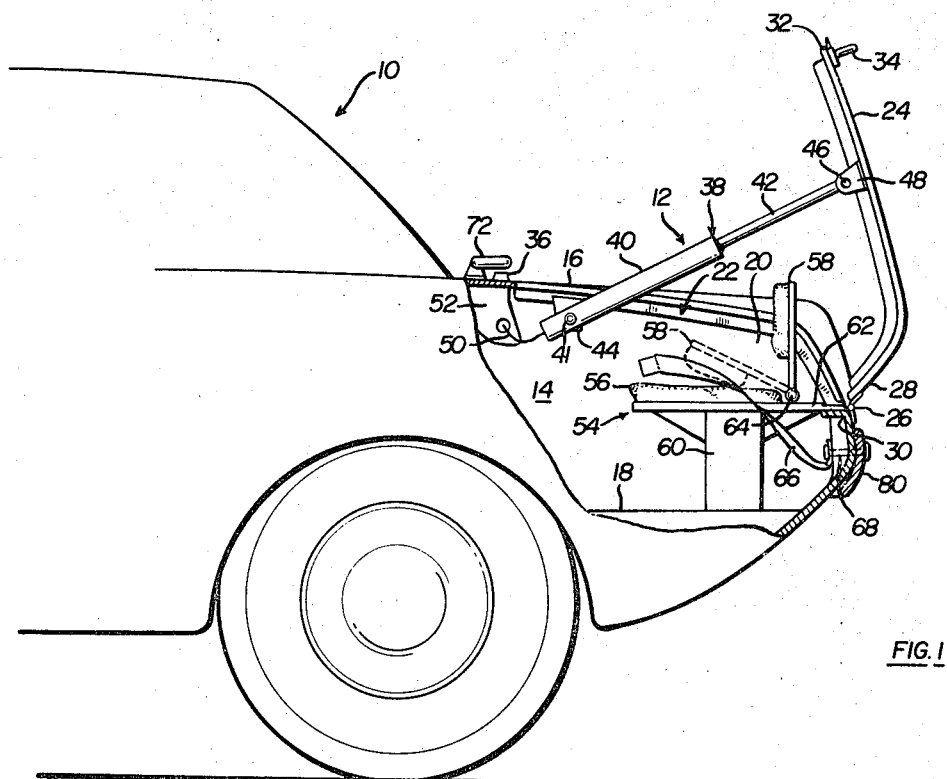
FIG. 1 is an elevational view, partly cut away, showing a trunk seat in accordance with one embodiment of the invention.

Referring first to FIG. 1, there is shown the rear portion of an automobile 10 having a trunk seat 12 in accordance with one embodiment of the invention. The automobile has a trunk space generally designated 14 at the rear thereof formed in the body 16 of the automobile, the trunk space being defined by a floor 18 and the usual body walls 20. The body walls form an opening at 22 which is normally closed by a trunk lid 24, but the trunk lid is shown in an open position in this view. It is believed to be unnecessary to describe the details of the construction of the trunk 12 since such trunks are completely conventional.

The trunk lid 24 has been modified in the conversion of the trunk of the automobile into a trunk seat. A hinge 26, which may be an ordinary piano-type hinge, is connected to the rear edge 28 of the trunk lid 24 and also to the top edge 30 of the rear portion of the body at the opening of the trunk. At the front edge 32 of the trunk lid 24, a latch 34 is mounted to engage a keeper 36 mounted on the body of the automobile adjacent the front of the trunk opening 22 and directly opposite the position of the latch 34 when the trunk lid 24 is closed. It may be seen that the the trunk lid 24 normally closes the opening 22 and may be swung rearwardly and upwardly to the position shown in FIG. 1 to open the trunk space 14.

A telescoping leg 38 is provided which consists of two hollow tubes 40 and 42. The tube 40 is pivotally connected by a pin 41 to a bracket 44 mounted on the body of the automobile at one side of the trunk opening. The tube 42 is pivotally connected by a pin 46 to a bracket 48 which is mounted on the far side of the trunk lid 24. The tube 42 is slidable within the tube 40 so that tube 42 can collapse into tube 40 when trunk lid 24 is lowered to close the trunk, and can extend from tube 40 when trunk lid 24 is opened to the position shown in FIG. 1. The tube 42 cannot extend from tube 40 any farther than the length shown in FIG. 1, and therefore the leg 38 limits the position of the lid 24 when it is opened so that it cannot be swung open any farther than the generally vertical position shown in FIG. 1. For this purpose, the tube 42 may have a flange at the left end thereof inside tube 40 which engages a corresponding flange at the right end of tube 40. A snap detent may be provided inside tube 40 to releasably lock the tube 42 in the position shown in FIG. 1 so that the trunk lid will not fall closed. A cable 50 extends through the tubes 40 and 42. Cable 50 is attached at one end to a hinge bracket 52 to which the trunk lid 24 was originally hinged but from which it has been disconnected. The other end of cable 50 is attached to the trunk lid 24 at bracket 48. The cable serves as a safety device to assure that the trunk lid cannot come completely loose.

Inside the trunk space 14, a seat 54 consisting of a base portion 56 and a back portion 58 is mounted on a platform 60 which is supported by the floor 18. An extension 62 of the base 56 is attached as by welding to the top edge 30 of the automobile's body at the rear of the trunk opening. The back 58 of the seat is connected by a hinge 64 to the base 56 so that the back 58 may be pivoted forwardly to the lowered position as indicated by the dashed-line view of the back. A seat belt 66 may be attached to the body as by bolts 68 to be used by a person as a safety precaution when sitting in the seat 54. When the back 58 is folded down to a horizontal position over the seat base 56, the back is completely within the trunk space 14 so that the lid 24 can be closed.

Figure 2:
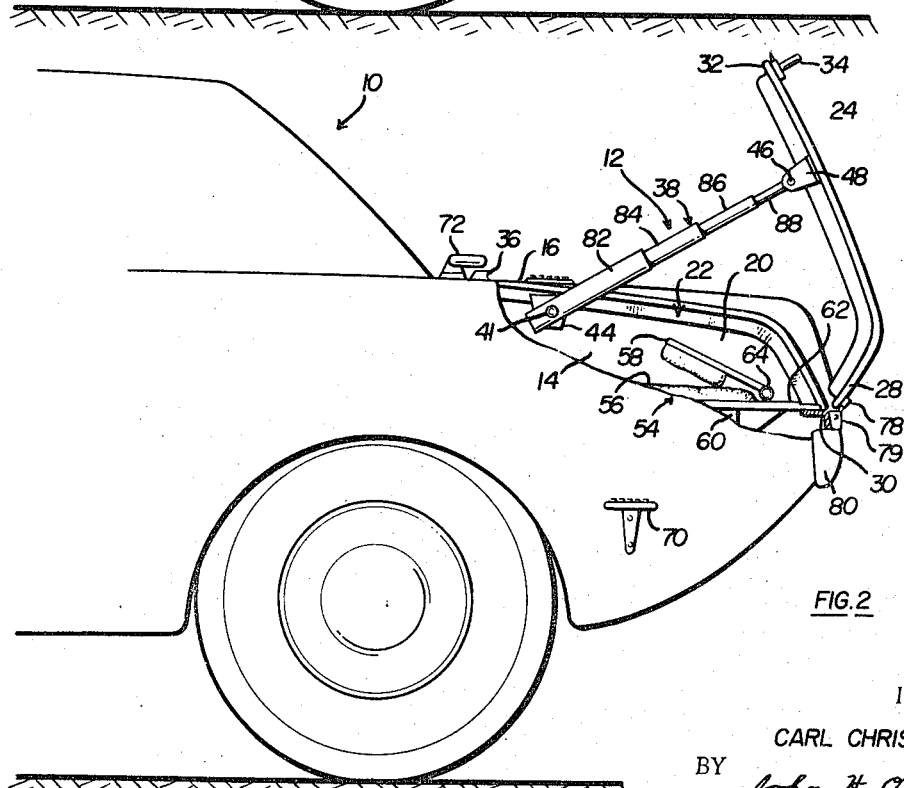
FIG. 2 is an elevational view, partly cut away, of a trunk seat in accordance with another embodiment of the invention.

If desired, steps may be attached to the fender of the automobile to be used by a person when climbing into the trunk space 14. One such step is shown in FIG. 2 at 70, and it will be understood that such a step may be provided on the fender of the automobile in FIG. 1 as well. Another step 72 may be provided on top of the rear deck of the automobile just ahead of the trunk space as shown in FIG. 1 and also in FIG. 2.

It is to be understood that two of the legs 38 may be provided, one at each side of the trunk lid 24. Only one such leg is visible in FIG. 1, but the other leg would be attached to the near side of the trunk lid 24 and also to the near side of the body of the automobile adjacent the trunk opening in the same manner as illustrated in FIG. 1.

The embodiment of FIG. 2 is very similar to that of FIG. 1, and consequently, the same reference numerals are used for like parts. One difference is that the rear edge 28 of the trunk lid 24 is not hingedly connected to the top edge 30 of the body at the rear of the trunk opening. Instead, a latch 78 is attached to rear portion 28 of the trunk lid, and a cooperating keeper 79 is attached to the bumper 80 of the vehicle. The leg 38, to be described more fully hereinafter, permits the trunk lid 24 to be swung upwardly and rearwardly to the position shown in FIG. 2 to open the trunk. The latch 78 is then engaged with the keeper 30 to secure the trunk lid to the bumper 80. This arrangement is particularly advantageous where the edge 30 of the body at the rear of the trunk opening extends a substantial distance above the bumper 80. Thus, the lower edge 28 of the trunk lid can be secured directly to the keeper 79 on the bumper, and this may make it possible to lower the trunk lid 24 to a lower position than would be feasible if it were hinged directly to the body of the automobile at 30. This feature is not essential with the arrangement as shown in FIG. 2 since the edge 30 is only slightly above the bumper 80.

Another difference of the embodiment of FIG. 2 as compared to that of FIG. 1 is that the leg 38 consists of four telescoping sections 82, 84, 86 and 88. These tubular sections 82, 84, 86 and 88 are shown in a fully extended position in FIG. 2 where they limit the position of the lid 24 to a generally vertical orientation as shown in FIG. 2. Each tubular section such as section 82 may be constructed in the manner described above in connection with tubular sections 40 and 42.

In all other respects, the embodiment of FIG. 2 is identical to that of FIG. 1, so the complete description will not be repeated.

Figure 3:
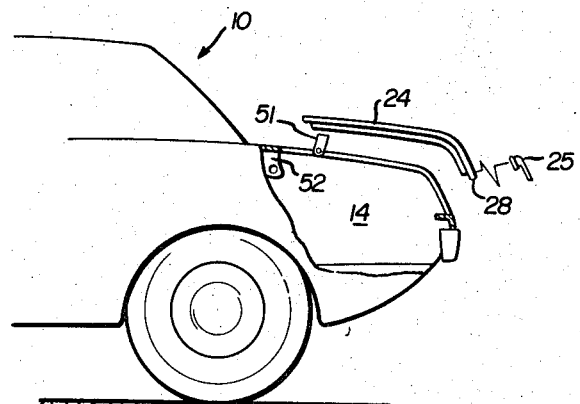
FIG. 3 is the first of a series of views illustrating the method of the invention, this view showing the step of disconnecting the hinges of the existing trunk lid of the trunk of an automobile.
Figure 4:
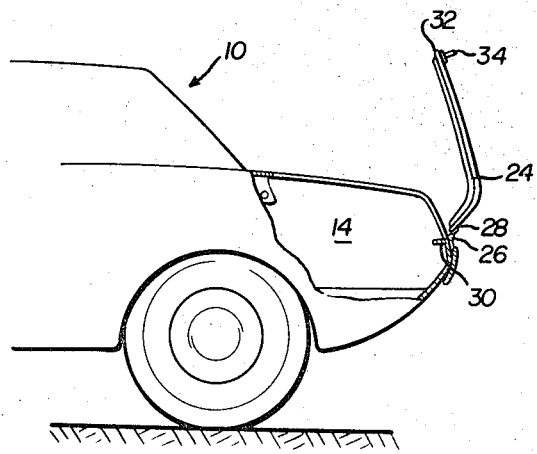
FIG. 4 illustrates the step of reconnecting the trunk lid to the body of the automobile so that it opens rearwardly.
Figure 5:
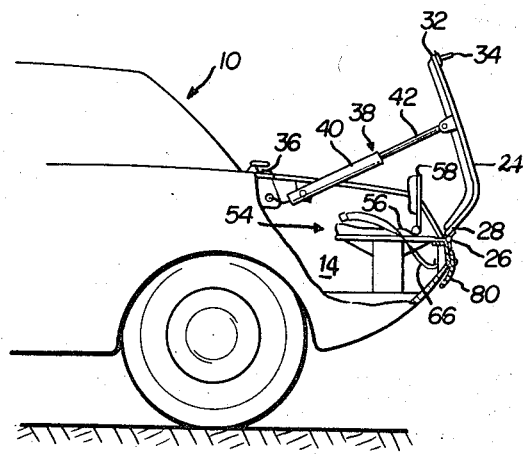
FIG. 5 illustrates the completion of the connecting of the trunk lid to the body of the automobile and also illustrates the step of mounting a seat in the trunk space of the automobile.

FIGS. 3, 4 and 5 illustrate a series of steps which are carried out in accordance with the method of the invention to convert the existing trunk of an automobile into a trunk seat. As shown in FIG. 3, the automobile 10 has a trunk space 14 at the rear end thereof which is constructed in the manner described in connection with FIG. 1. The trunk has a lid 24 which initially is connected by a hinge 51 to the bracket 52 secured to the body of the automobile at the front of the trunk space so that the trunk lid 24 may be swung upwardly and forwardly to open the trunk. The lid 24 may also have a latch 25 at the rear edge 28 thereof, although this latch 25 may be a built-in key lock without a handle. The first step of the method is to disconnect the hinge 51 from the lid 24 and the bracket 52 to free the trunk lid 24. Ordinarily a hinge 51 will be provided at each side of the trunk lid 24, so both of these hinges 51 are disconnected. The latch 25 may also be disconnected, but the construction of the latch may be such that it can be left in place.

The next step is to re-connect the trunk lid 24 to the body of the automobile so that it normally closes the opening of the trunk space 14 and can be swung upwardly and rearwardly to open the trunk space in the manner illustrated in FIG. 4. For the illustrated embodiment of the invention, the re-connecting step includes attaching the hinge 26 to the rear edge 28 of the trunk lid 24 and also to the edge 30 of the body at the rear of the trunk opening. This step may also include the connecting of a leg 38 to each side of the trunk lid 24 and to the body of the automobile on opposite sides of the trunk opening. One of the legs 38 is shown in place in FIG. 5, but it is to be understood that the attaching of this leg to the trunk lid and to the body of the automobile is considered to be part of the step of re-connecting the trunk lid to the automobile's body. The legs 38 are attached to the trunk lid and the body in the manner described in connection with FIG. 1.

At some appropriate point in the sequence a latch 34 is attached to the front edge 32 of the trunk lid, and a keeper 36, which is really part of the latch, is attached to the body of the automobile adjacent the front edge of the trunk opening.

Also at some appropriate point in the sequence, the seat 54 is mounted in the trunk space 14 in the position shown in FIG. 5. The seat 54 is exactly as described previously in connection with FIG. 1, and this description will not be repeated. It does, however, have the pivotal back 58 which may be swung down to a horizontal position to permit closing of the trunk lid 24. The seat belts 66 may also be attached. This completes the major steps of the method of converting the trunk of an automobile into a trunk seat.

It should be noted that if the trunk seat is to be made in accordance with the embodiment of FIG. 2, the method includes the step of attaching the latch 78 and keeper 79 respectively to the trunk lid and to the bumper 80. This step is carried out in lieu of the step of attaching the hinge 26 shown in FIG. 4.

It is to be noted that the sequence in which the steps of the method are performed is not critical. For example, the seat 54 could be mounted in the trunk space prior to re-connecting the lid 24 to the body of the automobile.

Thus, the invention provides a trunk seat which utilizes the existing trunk lid of an automobile, and thus makes it possible to convert the trunk of an ordinary commercially available automobile to a trunk seat. It is advantageous to provide the trunk seat in an automobile which has a relatively small trunk and trunk lid because when the trunk lid is open, it should not project too far up into the air. One popular automobile of this type available at the present time is known as the "Mustang." The method of converting a trunk of an automobile into a trunk seat involves only a few major steps and can be carried out easily with the aid of a simple conversion kit.

Having thus described my invention, I claim:

1. A method of converting an axisting trunk of an automobile into a trunk seat, the trunk being at the rear end of the body of the automobile and including an opening in the body having no seat therein and normally closed by a lid connected by hinges at the front thereof to the body of the automobile so that the trunk lid can swing upward and forward about said hinges to open the trunk, said method comprising the steps of permanently disconnecting said hinges relative to said body and said lid to free said trunk lid, permanently reconnecting said trunk lid to said body at said opening so that said lid normally closes said opening and the entire lid can swing upward and rearward to open said trunk, providing a latch at the front edge of said lid and an adjoining body portion for releasably latching said trunk lid in closed position, attaching securing means to a bumper at the rear end of said automobile below said trunk opening to enable said lid to be secured to said bumper when in open position, and mounting seat means in said trunk so that a person may sit thereon when said trunk lid is open.

2. The method as claimed in claim 1 in which said step of re-connecting said trunk lid to said body includes attaching telescoping legs between said lid and said body at opposite sides of said lid and said opening, with said legs when extended limiting the rearward movement of said lid to a generally vertical position.

3. In an automobile having a conventional trunk space at the rear of the body thereof with a trunk lid normally closing said trunk space but openable to allow access to said trunk space, the combination of means swingably connecting said trunk lid to said body for swinging movement of said lid rearward and upward to a generally vertical position to expose said trunk space, said connecting means including at least two telescoping leg means connected respectively to said lid and said body at opposite sides thereof extensible to allow opening of said lid and collapsible to allow closing of said lid relative to said trunk space, said leg means limiting the open position of said lid at a generally vertical position, at least one of said leg means being hollow, a cable extending through said hollow leg means and connected at one end to said lid and at the other end to said body, latch means having cooperating parts mounted respectively at the front edge of said lid and a portion of said body adjacent said trunk space for holding said lid in a closed position, and a seat mounted in said trunk space and facing forwardly of said body, said seat having a horizontal base portion and a back swingably connected to said base portion for movement of said back between a generally vertical position and a generally horzontal position over said seat.

4. The combination as claimed in claim 3 further including hinge means connecting the rear edge of said lid to said body.

5. The combination as claimed in claim 3 further including a second latch means having cooperating parts mounted respectively at the rear edge of said lid and a portion of said automobile below said lid for securing said lid to said portion when said lid is open.

References Cited

UNITED STATES PATENTS

| | | | |
|---|---|---|---|
| 1,812,487 | 6/1931 | Klausmeyer | 296—66 |
| 1,933,623 | 11/1933 | Gordon | 296—76 |
| 2,024,049 | 12/1935 | Mahon | 296—76X |
| 2,164,435 | 7/1939 | Suchanek | 296—66 |
| 2,996,210 | 8/1961 | Thomas | 296—76 |
| 3,413,031 | 11/1968 | Gafvert et al. | 296—63 |

BENJAMIN HERSH, Primary Examiner

J. A. PEKAR, Assistant Examiner